Sept. 16, 1924.  G. M. BRUBAKER, JR  1,508,594
STAY BOLT TAP
Filed Jan. 24, 1924
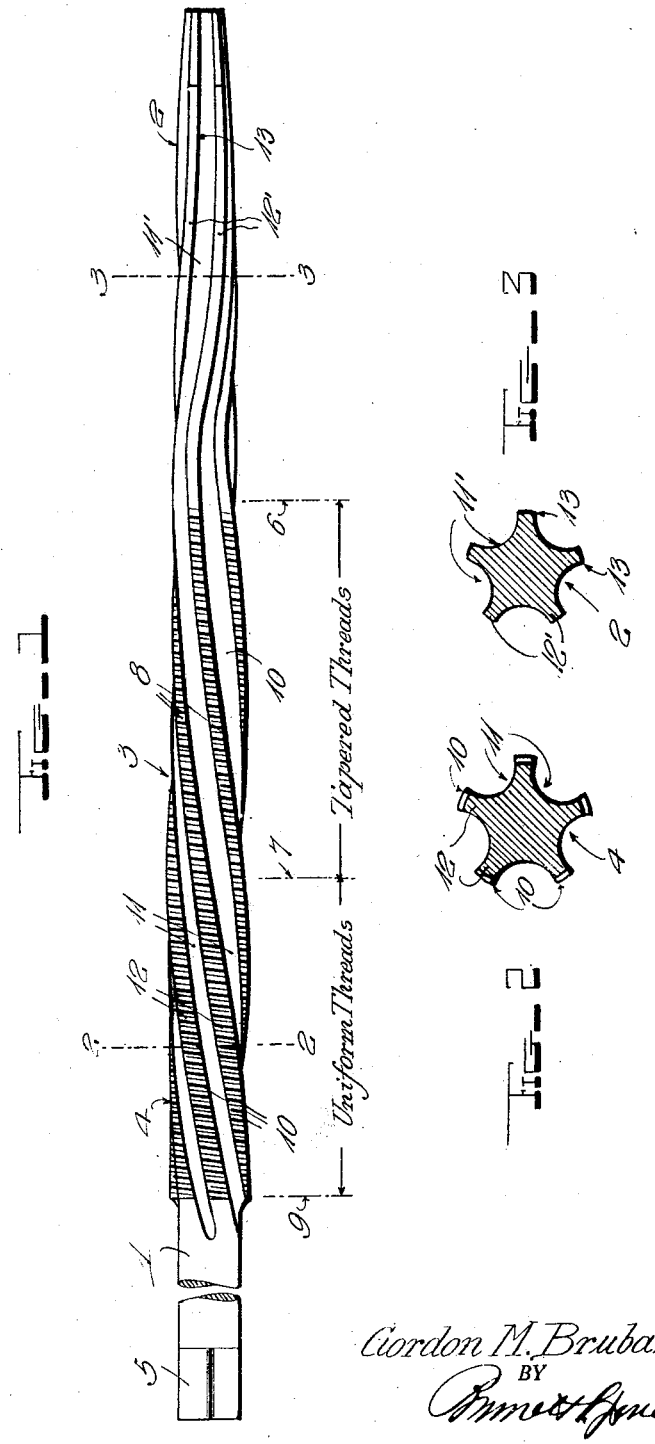
INVENTOR.
Gordon M. Brubaker, Jr.,
BY
ATTORNEY Patented Sept. 16, 1924.

1,508,594

UNITED STATES PATENT OFFICE.

GORDON MARK BRUBAKER, JR., OF MILLERSBURG, PENNSYLVANIA, ASSIGNOR TO W. L. BRUBAKER & BROS. COMPANY, OF MILLERSBURG, PENNSYLVANIA.

STAY-BOLT TAP.

Application filed January 24, 1924. Serial No. 688,232.

*To all whom it may concern:*

Be it known that I, GORDON MARK BRUBAKER, Jr., a citizen of the United States, residing at Millersburg, in the county of Dauphin and State of Pennsylvania, have invented new and useful Improvements in Stay-Bolt Taps, of which the following is a specification.

My invention relates to staybolt taps, and particularly to improvements in staybolt taps of the type shown in my prior Patent No. 1,434,870, dated November 7, 1922, such tap having a forward tapered reaming portion and a following tap portion, the latter comprising a forward threading surface continuous with said reaming portion and composed of tapered threads of successively and progressively increasing diameter and a rear threading surface composed of threads of like diameter, the said tapered threads being continuous with the reaming portion and the said threads of like diameter being continuous with and corresponding in diameter to the final thread of largest diameter of said tapered threads. This patented tap structure is also provided with spiral clearance grooves extending continuously along the reaming and threading portions and producing spiral ribs having shear-cut reaming edges and on which the threading surfaces are formed, the threads of which surfaces extend across the ribs at an angle to the axis of the tool.

In my aforesaid patented tap, the grooves and ribs of the reaming and threading portions, which are continuous with each other, extend spirally in the same direction. With such a construction, the chips from both the reaming and threading cutters feed in a common direction, i.e., rearwardly, along the flutes. This tends to cause clogging of the flutes and difficulty in starting the tool, as well as a tendency on the part of the reaming portion to lag during its working action, owing to the resistance set up by the mass of chips, especially in the operation of simultaneously reaming a hole in an inside boiler sheet and tapping a hole in an outside boiler sheet.

The object of my present invention is to provide a construction in which this objection is overcome, by extending the ribs and flutes of the reaming and threading portions spirally in opposite directions, as hereinafter fully described.

In the accompanying drawing, illustrating the invention,—

Figure 1 is a view in side elevation of a staybolt tap embodying my invention.

Figures 2 and 3 are cross-sections taken, respectively, on the lines 2—2 and 3—3 of Figure 1.

Referring now more particularly to the drawing, 1 designates the shank of the tool which comprises the forward reamer portion 2, the intermediate tap portion 3, and the rear tang portion 4, said tang portion having the usual angular end or head 5 by means of which it may be turned. As shown, the tap portion 3 has two threaded surfaces, to wit, a forward threaded cutting surface extending between the points 6 and 7 and composed of tapered threads 8, and a rear threaded finishing surface extending between the points 7 and 9 and composed of uniform threads 10, said threading surfaces intersecting at the point 7. Also, as shown, the reamer portion 2 extends from the extreme forward end of the tool to the point 6, and the shank tapers from the point 7 to such extreme forward end of the tool.

The shank is formed with longitudinal flutes, or grooves 11—11' producing the spiral ribs 12—12', on which ribs 12 the threads 8 and 10 are formed. Each groove 11 of the threading portion is continuous with a groove 11' of the reaming portion, and each rib 12 of the threading portion is also continuous with a rib 12' of the reaming portion. The grooves 11—11' and ribs 12—12' thus extend the full distance from the forward end of the tool to the point of intersection 9 between the working portion of the shank and the tang 4, the grooves providing clearance channels for the reception and discharge of the chips from both the reaming and the threading cutters, and the edges 13 of the ribs 12' forming the acting reaming cutters. In the use of the tool, constructed as above described, and as fully set forth in my aforesaid prior patent, the cutting edges of the reamer portion are employed to ream out the hole which is to be threaded, which operation is followed by the coarse cutting of the threads by the tapered threading surface 8 and the finishing of the threads by the uniform threading surface 10.

The essence of the present invention consists in extending the grooves 11—11' and ribs 12—12' of the threading and reaming surfaces in opposite directions, the grooves 11 and ribs 12 extending spirally in one direction, while the grooves 11' and ribs 12' extend spirally to the same degree in the reverse direction. Thus, for example, the grooves 11 and ribs 12 may be left hand grooves and ribs, on which ribs 12 the threads 8 and 10 are formed, while the grooves 11' and 12' are right hand grooves and ribs. This arrangement of the grooves and ribs of the threading and reaming portions may be so made in order that the threaded arrangement may correspond with that used in ordinary practice but, if desired, the grooves 11 and ribs 12 may be right hand grooves and ribs and the grooves 11' and ribs 12' left hand grooves and ribs, without departing from the spirit of the invention.

By the construction of the tool as above-described, the operation of simultaneously reaming a hole in an inside boiler sheet and tapping a hole in an outside boiler sheet is rendered much easier and more expeditious. In such operation, it will be understood that at the time the reamer is beginning its cut on the second sheet, the tap portion is beginning its cut on the first sheet. With a tool of ordinary construction, under such conditions, the flutes would be more or less filled with the chips from the first reaming cut, which set up a resistance to the starting of the tap portion and tend to subsequently cause a lag in the work of this portion of the tool in making its threading cut. By, however, having the reaming and tap portions extending spirally in opposite directions, this objection is overcome, since the chips from the reaming cut will feed in one direction, in the present instance forwardly, while the chips from the threading cut will feed in the opposite direction, in the present instance rearwardly, the above assuming that the reaming portion extends on a right hand spiral and the tap portion on a left hand spiral. The same result would also be gained by a reverse arrangement of the spirals, that is, by extending the reamer spiral in a left hand direction and the tap portion spiral in a right hand direction as will be readily understood. As a result, the reamer will secure a better cutting hold on the second sheet and assist in feeding the tap portion on its work, while none of the chips formed by the reamer will run back into the flute of the tap portion and cause such tap portion to clog or become hot from undue friction because of excessive work. The working operation of the tool is, therefore, not only rendered easier, but cleaner and better work may be done in much less time.

Having thus fully described my invention, I claim:—

1. A staybolt tap having a reaming portion and a threading portion and clearance grooves extending continuously along said portion and forming ribs on which the cutting edges of the reamer and threads of the threading portion are formed, the grooves and ribs of the reaming and threading portions extending spirally in reverse directions.

2. A staybolt tap having a forward reaming portion and a rear tap portion, grooves extending continuously along said portions and forming ribs, the ribs of the reaming portion being provided with cutting edges and the ribs of the threading portion with front tapered threads and rear uniform threads, the grooves and ribs of the reaming and threading portions extending spirally in reverse directions.

3. A staybolt tap having a reaming portion extending spirally in one direction and a tap portion extending spirally in the reverse direction.

In testimony whereof I affix my signature.

GORDON MARK BRUBAKER, Jr.